Dec. 10, 1957  A. G. THORP II  2,815,770
DIFFUSER
Filed May 11, 1954
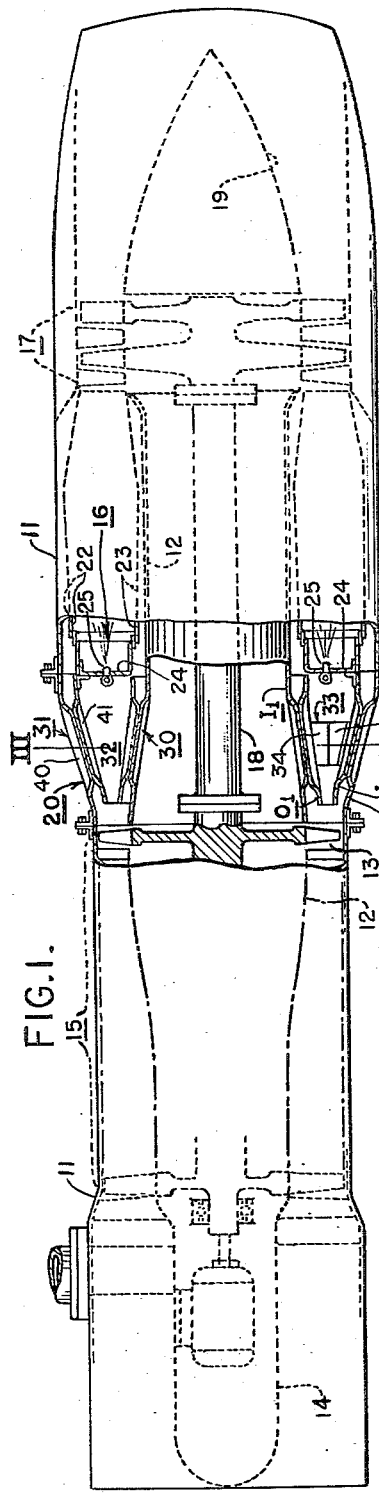
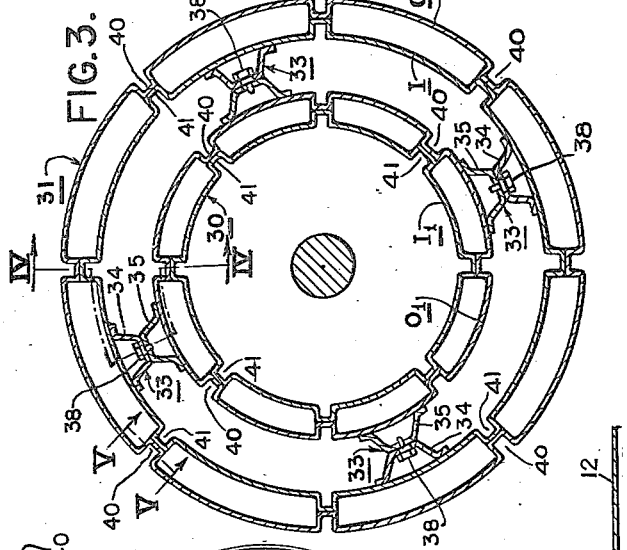
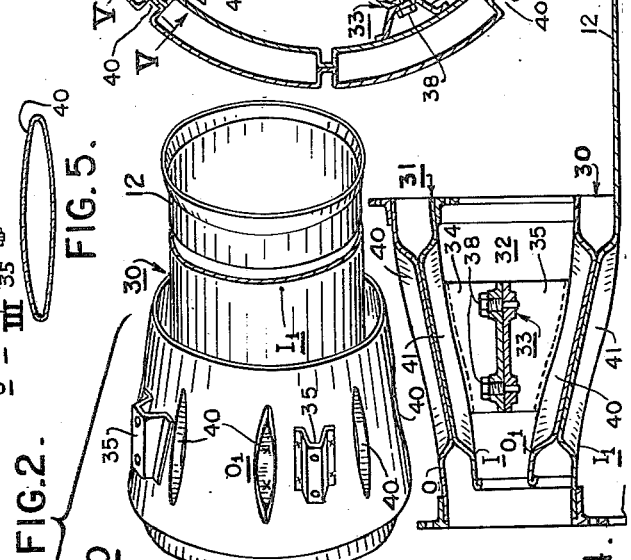
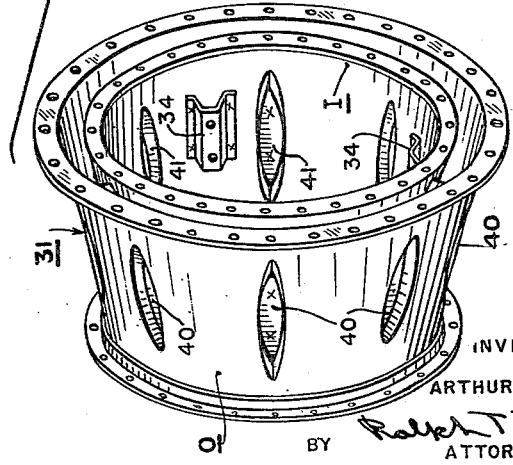
INVENTOR
ARTHUR G. THORP III
BY
ATTORNEY

United States Patent Office 2,815,770
Patented Dec. 10, 1957

2,815,770

DIFFUSER

Arthur G. Thorp II, Wallingford, Pa., assignor to Westinghouse Electric Corporation, East Pittsburgh, Pa., a corporation of Pennsylvania Application May 11, 1954, Serial No. 428,889

2 Claims. (Cl. 138—37)

This invention relates to power plants of the type having a compressor zone, a combustion zone and a turbine zone arranged for the axial flow of motive fluid. In particular the invention is concerned with the diffuser zone located between the compressor zone outlet and combustion zone inlet.

In an axial flow power plant the equipment for the respective zones is enclosed within an outer casing with compressor and turbine elements arranged for rotation with a common shaft. An inner casing forms a housing for the shaft and provides a wall which defines, with the outer casing, an annular passageway wherein is disposed the combustion equipment.

The diffuser equipment is positioned in the passageway, defined by the casings, at the outlet of the compressor for directing the air into the combustion zone in a manner to provide for optimum operating conditions in the combustion zone. The structure forming the diffuser equipment of the present invention is arranged to direct the air to the combustion equipment in a plurality of streams, since the combustion equipment forms a plurality of concentric annular fluid compartments within the combustion zone.

One principal object of the present invention is to provide a preformed diffuser unit which is adapted for ready assembly between the compressor and combustion zones of an axial flow power plant.

Another object is to provide such a unit which additionally forms the inner wall portion of the passageway.

Another object is to provide a diffuser unit which is simply and relatively inexpensively manufactured.

Another object is to provide a diffuser unit which may be formed of generally similarly constructed elements.

Other and more specific objects will be apparent from a more detailed understanding of the invention which may be had by reference to the accompanying drawings in which:

Fig. 1 is an elevational view partly in section of an axial flow gas turbine power plant;

Fig. 2 is a view of the diffuser unit separated into sections;

Fig. 3 is a transverse sectional view on the line III—III of Fig. 1;

Fig. 4 is an enlarged view on the line IV—IV of Fig. 3; and

Fig. 5 is an enlarged view on line V—V of Fig. 3 showing a detail.

Referring to Fig. 1 of the drawings, the gas turbine engine therein illustrated comprises a streamlined cylindrical outer casing 11 which may be mounted in or on the fuselage of an aircraft and is arranged for compactly housing operating elements which are disposed in alignment to minimize drag during operation of the engine at high speed. Supported concentrically within the casing 11 is an inner casing 12 forming, with the casing 11, an annular passageway 13 which extends longitudinally of the casings. Mounted within the inlet end portion of the outer casing 11 is a fairing section 14 for housing auxiliary control apparatus and adjacent thereto is a multiple stage axial-flow compressor indicated generally at 15, followed by fuel combustion apparatus 16 and a turbine 17. The turbine 17 is operatively connected to the compressor 15 by means of an axial shaft 18 which is suitably arranged for rotation within the casing 12. Beyond the turbine 17 within the outlet end of the casing 11 is another fairing section 19. The diffuser is generally indicated at 20 and is positioned within the passageway 13 at the discharge end of the compressor 15.

Air entering the inlet end of casing 11 will flow past the fairing section 14, through the compressor 15, diffuser 20, passageway 13 and turbine 17, past the fairing section 19 and exhaust through the outlet of casing 11.

The combustion zone 16 for the purpose of this invention is defined by annular walls 22 and 23 spaced from the outer and inner casings 11 and 12, and an end wall 24 provided with fuel nozzles 25. The several walls of the combustion chamber are suitably apertured for the distribution of air for proper combustion.

The diffuser 20 is formed of an annular inner section 30 and an annular outer section 31 each of which forms conduit means having their inlet and outlet ends communicating respectively with the compressor zone 15 and combustion zone 16. The sections are arranged to diverge with respect to each other from the compressor zone toward the combustion zone in order that air will be distributed over the walls 22 and 23 and to provide an annular diffusing space 32 in which air from the compressor may be reduced in velocity before entry into the combustion zone. The sections 30 and 31 are independently formed and are maintained in spaced relation by locking means 33.

In Fig. 2 the inner and outer sections 30 and 31 are shown disassembled. In Fig 3 the sections are shown assembled as a unit with the sections being generally similar in construction. The outer section is made up of an outer tubular member indicated at O and an inner tubular member indicated at I. The inner section is made up of generally similar outer and inner tubular members indicated at $O_1$ and $I_1$ respectively. The locking means 33 consists of brackets 34 on the inner tubular member I of the outer section and mating brackets 35 on the outer tubular member $O_1$ of the inner section. The brackets 34 and 35 are disposed about the members in a manner to suitably space the inner and outer sections 30 and 31. As shown in Fig. 4 the brackets 34 and 35 are united by pin bolts 38 which are arranged to permit relative radial expansion and contraction between the sections.

The tubular members of each section are provided with mating lugs 40, 41 for spacing the inner and outer tubular members and form each section into an annular conduit. For simplicity of construction and cheapness of manufacture the tubular members are preferably made of sheet material and the spacing lugs formed from the sheet material. In Fig. 3, the lugs 40 are struck in from the material of the outer members O and $O_1$ while the lugs 41 are struck out of the material of the inner members I and $I_1$. The lugs are similar and so relatively formed that, when the inner and outer tubular members of each section are assembled the lugs 40 and 41 register and engage each other in alignment, as shown, which divide each section or conduit into a multiplicity of longitudinal fluid paths. The lugs, which are formed in the sheet material, in addition to providing spacing means form spring-like structures having substantial resiliency so that, when the sections are assembled by the locking brackets 34 and 35, a tight fitting unitary structure is attained which may eliminate the necessity for bolting or welding the lugs under some conditions of use.

Obviously the dividing and spacing means could be formed otherwise than as disclosed in Fig. 3. The lugs, for example, could be formed or provided on only one or the other of the tubular members.

As shown in Figs. 1 and 2, the inner casing 12 is formed readily by providing an integral tubular extension on the inner tubular member $I_1$ of the inner section 30. This construction eliminates the necessity of additional structure, such as struts, for fixing an independently formed tubular casing in position within the outer casing 11.

Fig. 5 shows lugs 40 or 41 to have an air-foil shape which is the preferred construction. The adjacent lugs 40 and 41 may be readily secured together by welding or bolting in order to provide a positive interlock between the tubular members of each section.

The diffuser above described can be constructed of preformed elements which may be assembled and incorporated as a unit in the other structure of an axial flow gas turbine power plant. Suitable flanges such as those indicated on the tubular members O and I of the outer section may be used for securement to suitable flanges of the casing 11 and the combustion chamber outer wall 22.

While the invention has been shown in but one form, it will be obvious to those skilled in the art that it is not so limited, but is susceptible of various changes and modifications without departing from the spirit thereof.

What is claimed is:

1. A preformed diffuser section for incorporation between the compressor and combustion sections of an axial flow gas turbine power plant and comprising a pair of converging and a pair of diverging concentric tubular members, spacing lugs extending from at least one tubular member of each pair and adapted to be secured to the other member of each pair thereby forming inner and outer annular fluid conduit sections, and means between the outer tubular member of the inner conduit section and the inner tubular member of the outer conduit section for securing said conduit sections into a unitary structure said securing means including a plurality of transversely-disposed pins anchored in one and slidably received in the other of said outer tubular member and inner tubular member, said outer tubular member and said inner tubular member forming a central annular diverging fluid conduit.

2. A preformed diffuser section for incorporation between the compressor and combustion zones of an axial flow gas turbine power plant and comprising a pair of inner and a pair of outer concentric tubular members formed of sheet material, spacing lugs embossed on the tubular members forming spring-like projections, the lugs on one tubular member of each pair extending toward the lugs of the other tubular member of each pair to be in contact therewith and means between the outer tubular member of the inner pair and the inner tubular member of the outer pair for locking said members together, said means including a pair of opposed brackets disposed in abutment with each other and adapted to exert pressure on the contacted lugs and maintain the tubular members of the inner and outer pair assembled said means further including a transversely disposed pin anchored in one of said brackets and slidably received in the other of said brackets and preventing relative axial movement between said pairs of tubular members but permitting limited radial movement therebetween.

References Cited in the file of this patent

UNITED STATES PATENTS

| | | |
|---|---|---|
| 2,343,560 | Klein | Mar. 7, 1944 |
| 2,396,522 | Modine | Mar. 12, 1946 |
| 2,556,161 | Bailey et al. | June 12, 1951 |
| 2,570,155 | Redding | Oct. 2, 1951 |
| 2,648,353 | Haworth | Aug. 11, 1953 |